R. O. STUTSMAN.
PEANUT ROASTER.
APPLICATION FILED MAR. 13, 1909.
930,104.
Patented Aug. 3, 1909.
3 SHEETS—SHEET 1.
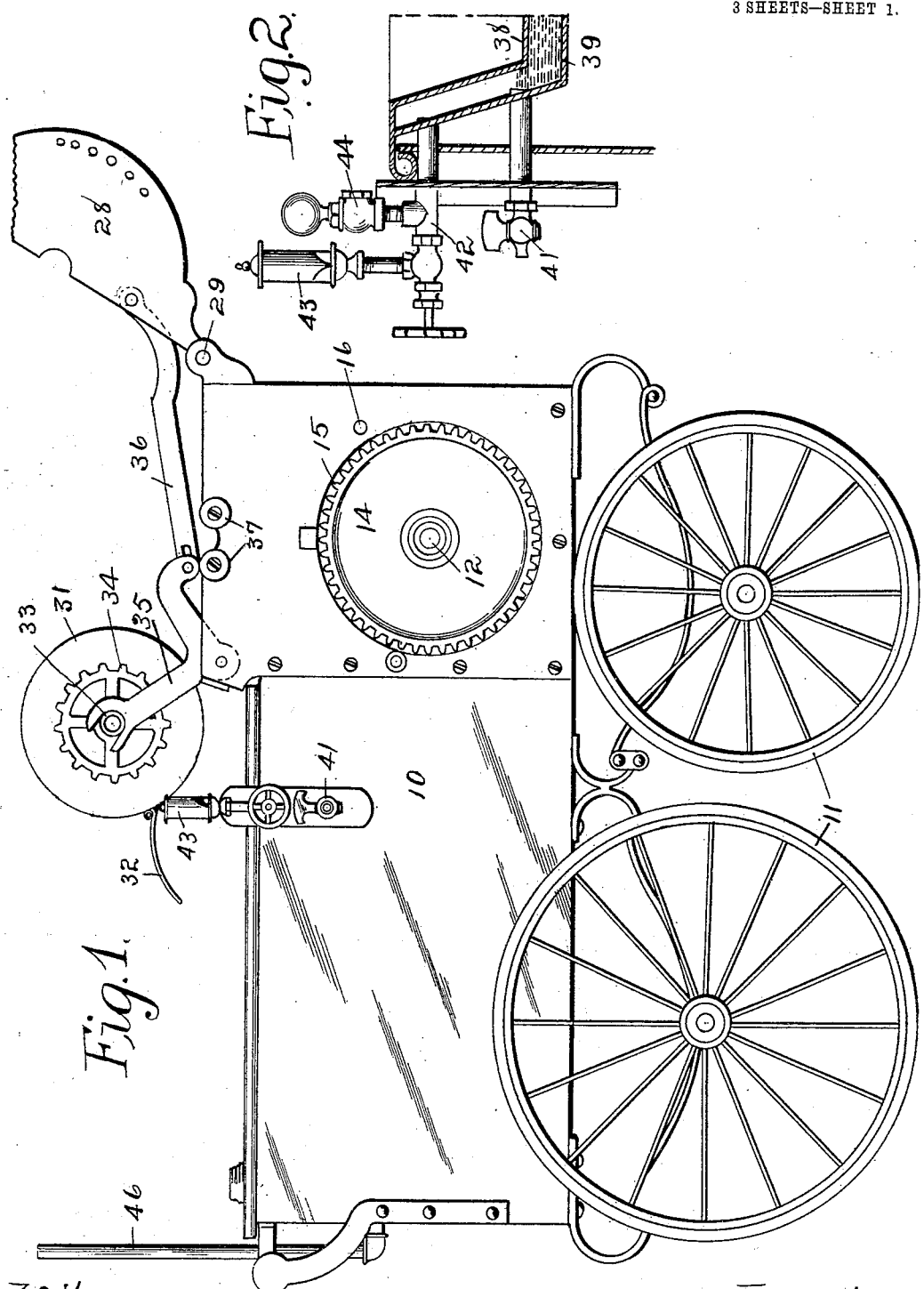
Witnesses
A. G. Hague
F. C. Dahlberg
Inventor
R. O. Stutsman
by Orwig & Lau attys.

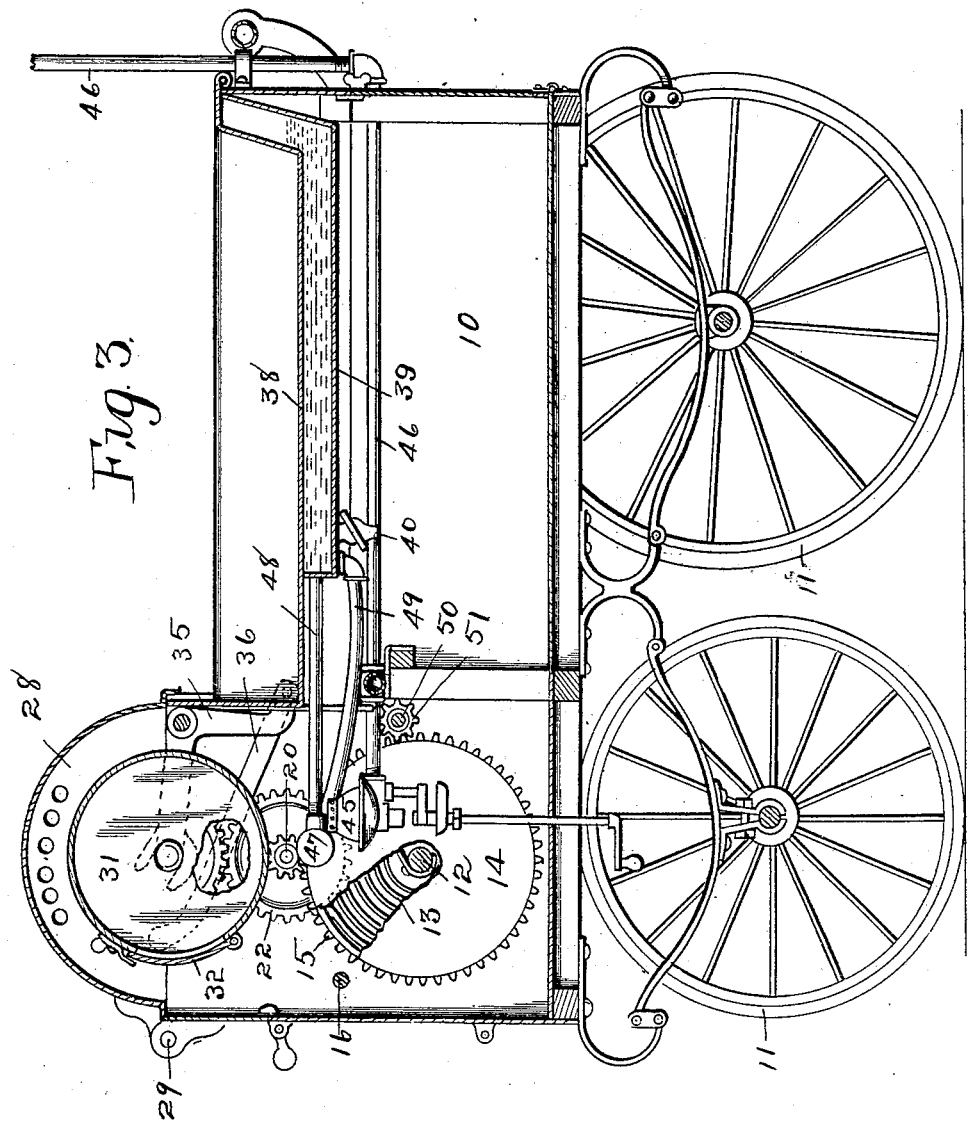

R. O. STUTSMAN.
PEANUT ROASTER.
APPLICATION FILED MAR. 13, 1909.
930,104.
Patented Aug. 3, 1909.
3 SHEETS—SHEET 3.
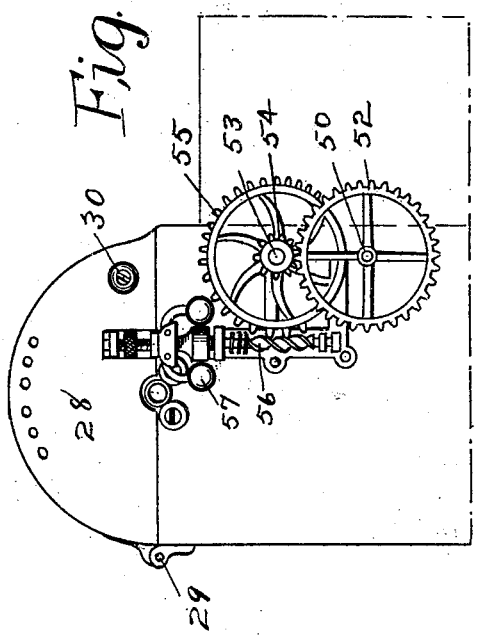
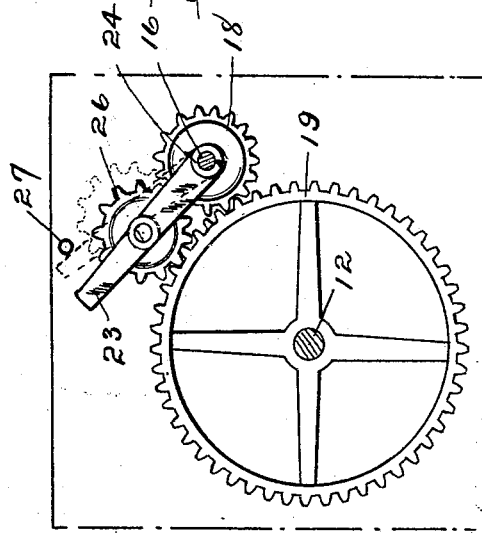
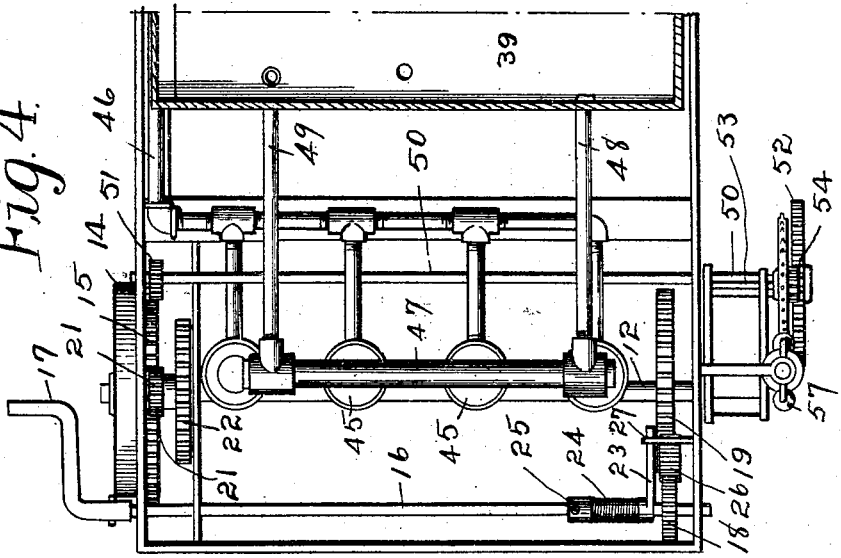
Witnesses
A. G. Hague
F. C. Dahlberg
Inventor
R. O. Stutsman
by Onvig & Lane Attys

UNITED STATES PATENT OFFICE.

REUBEN O. STUTSMAN, OF DES MOINES, IOWA.

PEANUT-ROASTER.

No. 930,104.　　　　Specification of Letters Patent.　　　　Patented Aug. 3, 1909.

Application filed March 13, 1909.　Serial No. 483,231.

*To all whom it may concern:*

Be it known that I, REUBEN O. STUTSMAN, a citizen of the United States, residing at Des Moines, county of Polk, and State of Iowa, have invented a certain new and useful Peanut-Roaster, of which the following is a specification.

This invention relates to that class of peanut roasters in which a roasting cylinder is turned by means of spring actuated mechanism, and the same spring actuated mechanism is arranged to operate a centrifugal ball governor for the purpose of drawing attention to the peanut roaster, and in which the roasting cylinder is heated by means of gasolene burners, and in which steam is generated for the purpose of warming peanuts and for the purpose of operating a steam whistle.

My object is to provide a peanut roaster of this class, of simple, durable and inexpensive construction, in which the roasting cylinder is elevated to position over the warming pan and its contents dumped when the hinged cover of the peanut roaster is elevated.

A further object is to provide improved gearing devices for operating the roasting cylinder and the ball governor and also in this connection to provide means for automatically locking the shaft to which the driving spring is attached against backward movement.

A further object is to provide improved means for heating the water in the warming pan and for producing steam, which means are so arranged as to be heated by the same burners that serve to roast the peanuts in the roasting cylinder.

My invention consists in the construction, arrangement and combination of the various parts of the device, whereby the objects contemplated are attained, as hereinafter more fully set forth, pointed out in my claims, and illustrated in the accompanying drawings, in which—

Figure 1 shows a side elevation of a peanut roaster embodying my invention with the roasting cylinder in position for discharging its contents. Fig. 2 shows a detail sectional view illustrating a part of the warming pan with the steam whistle and water pet-cock in position. Fig. 3 shows a central longitudinal sectional view through the peanut roaster with the roasting cylinder in position for roasting peanuts. Fig. 4 shows a top or plan view of a part of the device with the cover of the peanut roaster removed to illustrate the gearing mechanism for operating the roasting cylinder and other parts and the heating device. Fig. 5 shows a detail view of one side of the machine illustrating the ball governor device, and Fig. 6 shows an enlarged detail view illustrating the means for automatically locking the shaft to which the spring is attached against backward movement.

Referring to the accompanying drawings, I have used the reference numeral 10 to indicate the frame of the peanut roaster mounted on the supporting wheels 11. On one end of the frame is a shaft 12 extended across the machine and having bearings in the sides of the frame. This shaft has a convolute spring 13 fixed on one end, the other end of said spring being fixed to a casing 14 rotatably mounted on the shaft 12 and having cog teeth 15 on its periphery. I provide for winding up the spring as follows: The numeral 16 indicates a shaft having bearings in the sides of the machine frame and having a detachable crank 17 on one end. On the other end is a small pinion 18 in mesh with a large pinion 19 fixed to the shaft 12. Mounted in the frame above the casing 14 is a short shaft 20 having a small pinion 21 thereon in mesh with the cog teeth 15 on the spring casing 14. On the same shaft 20 is a pinion 22 for purposes hereinafter made clear.

I have provided for automatically locking the shaft to which the spring is attached against backward movement as follows: Mounted on the shaft 16 is a pivoted arm 23 extended toward and over the pinion 19, as shown in Fig. 6. The arm 23 is rotatably mounted upon the shaft 16 and it is engaged at one side by an extensible coil spring 24 on the shaft 16, which spring is engaged at its other end by a collar 25 fixed to the shaft 16. In this way, the spring serves to apply friction to the arm 23 in sufficient amount to cause the arm 23 to move with the shaft 16 so long as said movement is not interfered with by a stationary object. Mounted upon the arm 23 is a pinion 26 in mesh with the pinion 18 and also designed to mesh with the pinion 19 when the arm 23 is at its downward limit. The pin 27 is fixed to the frame in position to be engaged by the end of the arm 23 to thereby limit the upward movement of said arm as shown by dotted lines in Fig. 6. The operation of this part of the device, comprising the arm 23, and pinion 26, is as follows: When the crank 17 is turned in a direction for winding up the spring 13, then the friction applied to the arm 23 by the spring 24 will be sufficient to carry the arm 23 upwardly to the position shown by dotted lines in Fig. 6. Then the pinions 18 and 26 may freely rotate and the pinion 18 will drive the pinion 19 and in this manner wind up the spring 13. When the operator releases the crank 17, the spring 13 will cause the pinion 19 to move in a reverse direction and this will operate the pinion 18 and the shaft 16 in the reverse direction thereby immediately causing the arm 23 and its pinion 26 to move downwardly into engagement with the pinion 19, as shown by solid lines in Fig. 6. This will always operate to immediately stop the pinion 19 and firmly lock it against further rotation for the reason that the pinion 26 and the pinion 19, both being in mesh with the pinion 18, will have their adjacent portions moved in opposite directions by the pinion 18, and, therefore, even if only the ends of the teeth of the pinions 19 and 26 touch each other, the pinion 19 will be firmly locked and if the ends of the teeth should slip past each other, then the teeth themselves will engage each other in such a manner as to prevent further movement of the pinion 19.

One of the particular advantages of this device is that as soon as the crank 17 is operated to wind up the main spring, the pinion 26 is immediately elevated out of engagement with the pinion 19 and then during the time that the crank 17 is being rotated, the pinion 26 is held out of engagement with the pinion 19, and, hence, there is no noise or friction such as is the case with an ordinary spring actuated pawl for preventing backward movement of the pinion 19.

When the pinions 18, 19, and 26 are in the position shown in Fig. 6, it is obvious that the pinion 19 is locked against rotation in either direction. Furthermore, the friction device comprising the spring 24 is not necessary to the operation of the locking mechanism for the reason that when power is applied to the shaft 16 to turn the pinion 18, the pinion 19 will also be turned, but it will be in a direction that will throw the pinion 26 and the arm 23 upwardly to position out of engagement with the pinion 19. In most instances, however, I prefer to use the friction device.

At the top of the frame 10 above the shaft 20 is a cover 28 provided with hinges 29. This cover is provided with handles 30 at its ends by which it may be elevated.

The roasting cylinder is indicated by the numeral 31 and is provided with a door opening at one side covered by a hinged door 32. The ends of the roasting cylinder are provided with journals 33 extended outwardly beyond the cylinder and on one of said journals is a pinion 34 designed to mesh with the pinion 22 on the shaft 20 when the roasting cylinder is in its position for roasting. I support the roasting cylinder as follows: Pivoted to the sides of the frame 10 are two bell crank levers 35 each having one end slotted to receive a journal 33 and each having at its other end, a link 36 having a limited sliding connection with the bell crank lever 35; and the other end of each link 36 is pivoted to the hinged cover 28, as clearly shown in Fig. 1. This part of the device operates as follows: When the roasting cylinder is in the position shown in Fig. 3, it will be rotated by the pinion 22. Then, when the operator grasps the handles 30 to raise the cover 28, the arms 36 and the bell crank levers 35 will elevate the roasting cylinder and move it to the position shown in Fig. 1, where it will be directly over the warming pan. The contents of the cylinder may then be discharged into the warming pan by opening the door 32; or the roasting cylinder may be removed from the bell crank levers 35 by grasping the ends of the journals 33 and moving them out of the slotted ends of the bell crank levers. When the roasting cylinder is in the position shown in Fig. 3, the projecting ends of the journals 33 are designed to rest in engagement with the antifriction rollers 37 fixed to the frame 10, so that the cylinder may freely rotate with a minimum of friction.

The warming pan is formed with double walls 38 and 39 to provide a water and steam chamber between them. In the bottom of the warming pan is a pet-cock 40 and arranged at one side of the warming pan at about the water level thereof is a second pet-cock 41 by means of which the operator may determine the quantity of water in the warming pan. Communicating with the top portion of the warming pan is a pipe 42 having a steam whistle 43 connected with it and a discharge pipe 44. I provide for heating the water in the warming pan as follows: The reference numeral 45 indicates a series of gasolene burners of ordinary construction communicating with a gasolene feed pipe 46, said burners being all arranged under the roasting cylinder so that the heat from them is applied to the roasting cylinder. Arranged above the gasolene burners 45 is a water pipe 47 having a pipe 48 communicating with it at one end, which pipe discharges into the warming pan between the upper and lower walls thereof, as shown in Fig. 3, and at the other end of the pipe 47 is a pipe 49 communicating with the bottom of the warming pan. Said pipe 47 is so arranged that it will be heated by the same burners that are used to heat the roasting cylinder, and, hence, no additional burners are required for keeping the water in the warming pan heated and for producing steam required to operate the whistle.

The means for operating the ball governor device comprises a shaft 50 extended across the machine frame and having a small pinion 51 on one end in mesh with the cog teeth 15 of the spring case 14. On the other end of this shaft is a large pinion 52. Above the pinion 52 is a short shaft 53 having a small pinion 54 thereon in mesh with the pinion 52 and a large worm-wheel 55. This worm-wheel 55 is in mesh with a worm 56 arranged on the ball governor shaft of ordinary construction, the ball governor being indicated by the reference numeral 57. In this way I obtain power for running the ball governor direct from the cogs 15, and, hence, the shaft 50 and the mechanism connected with it for operating the ball governor need only be comparatively light and inexpensive. Heretofore devices of this kind have had the ball governor device connected with and operated by the gearing mechanism that was used to rotate the roasting cylinder, and, hence, it had to be strong and heavy enough to transmit the power required for operating the roasting cylinder, but by the arrangement shown, there are no strains thrown upon the ball governor mechanism except such as are required to keep the ball governor itself in motion. In this way, I not only provide an inexpensive construction, but I eliminate a great amount of friction.

It is obvious that the device herein shown and described is especially adapted for use in roasting peanuts, but that it could be used for roasting other articles or for other purposes without departing from the spirit of my invention.

I claim as my invention.

1. In a device of the class described, the combination of a receptacle to contain articles to be roasted, an open-topped frame, bell crank levers connected to the frame and to the receptacle, in one position being designed to support the receptacle within the frame and in another position being designed to support the receptacle above and to one side of the frame, a hinged cover for the frame, and links connected to the hinged cover and to the bell crank levers.

2. In a device of the class described, the combination of a receptacle to contain articles to be roasted, an open-topped frame, bell crank levers connected to the frame and to the receptacle, in one position being designed to support the receptacle within the frame and in another position being designed to support the receptacle above and to one side of the frame, a hinged cover for the frame, and links connected to the hinged cover and to the bell crank levers, said receptacle being detachably connected with said bell crank levers.

3. In a device of the class described, the combination of a roasting cylinder, an open-topped frame, two bell crank levers pivoted to the frame and each having a slotted bearing in one end to receive the roasting cylinder, a hinged cover for the frame and links pivoted to the hinged cover and pivotally and slidingly connected to the bell crank levers, substantially as set forth.

4. In a device of the class described, the combination of a frame, an open-topped compartment in the frame, a warming pan adjacent to the open-topped compartment, a roasting receptacle having an opening therein, a door to cover said opening, two bell crank levers pivoted to the open-topped compartment at the side thereof adjacent to the warming pan, said levers having the roasting receptacle rotatably mounted therein, a hinged cover for the open-topped compartment, and links connected to the cover and to said bell crank levers, said parts being so arranged that when the cover is closed, the roasting receptacle will be contained within the open-topped compartment, and when the cover is opened, the roasting receptacle will be elevated out of the open-topped compartment and moved to position above the warming pan so that the contents of the roasting receptacle may be discharged into the warming pan by opening the door of the roasting receptacle.

5. In a device of the class described, the combination of an open-topped frame, two anti-friction rollers mounted thereon near the upper edges thereof, a roasting receptacle having a projecting journal thereon designed to rest on said rollers.

6. In a device of the class described, the combination of a frame, a roasting receptacle, a warming pan with a water jacket surrounding it, a burner arranged below the roasting receptacle for applying heat to it, a pipe interposed between the burner and the roasting receptacle, and means for connecting said pipe at both ends with the water jacket surrounding the warming pan.

7. In a device of the class described, the combination of a frame, a roasting receptacle mounted therein, a warming pan, a water jacket surrounding the warming pan, a series of burners arranged in a substantially horizontal plane below the roasting receptacle to apply heat to the roasting receptacle, a substantially horizontally arranged pipe disposed between the said burners and the said roasting receptacles, and pipes leading from the ends of said horizontally arranged pipe to communicate with the water jacket.

8. In a device of the class described, the combination of a frame, a roasting receptacle rotatably mounted, a spring actuated gearing device for operating the roasting receptacle, said gearing device including a pinion, a shaft, means for manually rotating the shaft, a pinion on the shaft in mesh with the said pinion of the gearing device, an arm carried by the shaft, a pinion carried by the arm and in mesh with the pinion on the shaft, said arm being capable of movement to position with the pinion carried thereby in mesh with the pinion of the said gearing device to position out of mesh with it.

9. In a device of the class described, the combination of a frame, a roasting receptacle rotatably mounted, a spring actuated gearing device for operating the roasting receptacle, said gearing device including a pinion and shaft, means for manually rotating the shaft, a pinion on the shaft in mesh with the said pinion of the gearing device, an arm carried by the shaft, a pinion carried by the arm and in mesh with the pinion on the shaft, said arm being capable of movement to position with the pinion carried thereby in mesh with the pinion of the said gearing device to position out of mesh with it, and means for limiting the movement of the arm away from the pinion of the gearing device.

10. In a device of the class described, the combination of a spring actuated gearing device including a pinion, a shaft, means for manually rotating the shaft, a pinion on the shaft in mesh with the pinion of the gearing device, an arm rotatably mounted on the shaft, a friction device tending to move said arm in unison with the shaft, a pinion carried by the arm and in mesh with the pinion on the shaft, and capable of being moved to position in mesh with the pinion of the gearing device.

11. In a device of the class described, the combination of a spring actuated gearing device including a pinion, a shaft, a crank for manually turning the shaft, a pinion fixed to the shaft and in mesh with the pinion of the gearing device, an arm rotatably mounted on the shaft, a spring wound upon the shaft and in frictional engagement with said arm, a collar fixed to the shaft to engage said spring, a pinion rotatably mounted on said arm and in mesh with the pinion on the shaft, said arm being capable of moving to position with its pinion in engagement with the pinion of the gearing device, and means for limiting the movement of said arm away from the pinion of the gearing device.

12. In a device of the class described, the combination of a frame, a rotatable roasting receptacle in the frame, a spring actuated gearing device carried by the frame and operatively connected with the roasting receptacle for rotating it, a ball governor carried by the frame, a shaft mounted in the frame, means interposed between the shaft and the ball governor device for operating the ball governor device by the shaft, a pinion on said shaft in mesh with the first pinion of the spring actuated gearing device.

13. In a device of the class described, the combination of a frame, a shaft rotatably mounted in the frame, a spring fixed to and wound upon the shaft, a casing fixed to the other end of the spring and having cog teeth thereon, a second shaft above the first, a small pinion on the second shaft, a roasting receptacle, a pinion connected therewith and in mesh with the last mentioned pinion third shaft mounted in the frame, a small pinion thereon in mesh with the cog teeth on the casing, a ball governor device mounted on the frame, and gearing devices interposed between the said third shaft and the ball governor device for operating the latter.

Des Moines, Iowa, Jan. 30, 1909.

REUBEN O. STUTSMAN.

Witnesses:
NELLIE M. TAYLOR,
MILDRED B. GOLDIZEN.